(12) United States Patent
Wright et al.

(10) Patent No.: US 7,761,486 B2
(45) Date of Patent: Jul. 20, 2010

(54) MEMORY MANAGEMENT SYSTEM THAT SUPPORTS BOTH ADDRESS-REFERENCED OBJECTS AND IDENTIFIER-REFERENCED OBJECTS

(75) Inventors: Gregory M. Wright, Mountain View, CA (US); Bernd J. Mathiske, Cupertino, CA (US); Mario I. Wolczko, San Carlos, CA (US); Matthew L. Seidl, Austin, TX (US)

(73) Assignee: Oracle America, Inc., Redwood Shores, CA (US)

( * ) Notice: Subject to any disclaimer, the term of this patent is extended or adjusted under 35 U.S.C. 154(b) by 327 days.

(21) Appl. No.: 11/325,383

(22) Filed: Jan. 3, 2006

(65) Prior Publication Data

US 2007/0162528 A1 Jul. 12, 2007

(51) Int. Cl.
*G06F 12/00* (2006.01)
*G06F 17/30* (2006.01)
*G06F 15/16* (2006.01)

(52) U.S. Cl. .................. 707/813; 707/815; 707/819
(58) Field of Classification Search .......... 707/206, 707/103 R, 999.01; 711/148–207; 709/213–224; 714/4
See application file for complete search history.

(56) References Cited

U.S. PATENT DOCUMENTS

| | | | | |
|---|---|---|---|---|
| 5,974,421 A * | 10/1999 | Krishnaswamy et al. | ........... | 1/1 |
| 6,178,519 B1 * | 1/2001 | Tucker | .......................... | 714/4 |
| 6,859,868 B2 * | 2/2005 | Wright et al. | ............... | 711/207 |
| 7,024,436 B2 * | 4/2006 | Kolodner et al. | ................... | 1/1 |
| 7,249,225 B1 * | 7/2007 | Seidl et al. | ................. | 711/145 |
| 2005/0044340 A1 * | 2/2005 | Sheets et al. | ................ | 711/206 |

* cited by examiner

*Primary Examiner*—Cam Y Truong
*Assistant Examiner*—Cecile Vo
(74) *Attorney, Agent, or Firm*—Park, Vaughan & Fleming LLP (57) ABSTRACT

One embodiment of the present invention provides a memory-management system that supports both address-referenced objects and identifier-referenced objects, wherein an address-referenced object is accessed through a reference containing an address of the object, and wherein an identifier-referenced object is accessed through a reference containing an object identifier (OID) for the object. During operation, the system receives a request to access an object. Next, the system determines if the object is an address-referenced object or an identifier-referenced object. If the object is an address-referenced object, the system accesses the object using the associated address for the object. If the object is an identifier-referenced object, the system accesses the object by using the associated OID for the object to look up the address for the object, and then using the address to access the object.

18 Claims, 7 Drawing Sheets

MEMORY MANAGEMENT SYSTEM THAT SUPPORTS BOTH ADDRESS-REFERENCED OBJECTS AND IDENTIFIER-REFERENCED OBJECTS

BACKGROUND

1. Field of the Invention

The present invention relates to computer systems. More specifically, the present invention relates to a method and an apparatus for efficiently managing objects in a memory-management system that supports both address-referenced objects and identifier-referenced objects and facilitates garbage collection.

2. Related Art

Users of object-oriented programming systems are demanding the ability to scale virtual machines to support larger heap sizes and larger numbers of threads. This allows more objects to be created and stored in the heaps, and allows these objects to be accessed by multiple threads. At the same time, it also requires the computer system to manage these objects more efficiently. For example, the larger heaps require significantly more work during garbage collection operations, which causes longer pause times. It is therefore desirable to provide support for concurrent garbage collection so that when threads using part of the memory are stopped for garbage collection, threads using the rest of the memory can continue to execute.

During garbage collection, objects may be frequently relocated within the memory. Conventionally, an object is referenced by an address. However, recently developed systems allow an object to be referenced by an object identifier (OID). Object relocation operations during garbage collection operations are more efficient in OID-based reference systems than in conventional address-based reference systems. This is because in an OID-based reference system, the location of an object is stored in only one place, an object table entry (OTE). Therefore, only the OTE needs to be updated during relocation of the object. In contrast, an address-based reference system requires all pointers that refer to the object to be updated to point to the new location of the object, which can involve a large amount of work.

Unfortunately, the operations involved in managing OIDs, and the associated OTEs to support an OID-based reference system create a significant amount of overhead. Furthermore, an OID-based reference system is slower than an address-based reference system when allocating new objects, because an OID and a region of free memory need to be found for each newly allocated object.

Hence, what is needed is a method and apparatus for managing objects more efficiently in a memory-management system without the above-described problems.

SUMMARY

One embodiment of the present invention provides a memory-management system that supports both address-referenced objects and identifier-referenced objects, wherein an address-referenced object is accessed through a reference containing an address of the object, and wherein an identifier-referenced object is accessed through a reference containing an object identifier (OID) for the object. During operation, the system receives a request to access an object. Next, the system determines if the object is an address-referenced object or an identifier-referenced object. If the object is an address-referenced object, the system accesses the object using the associated address for the object. If the object is an identifier-referenced object, the system accesses the object by using the associated OID for the object to look up the address for the object, and then using the address to access the object.

In a variation on this embodiment, prior to accessing the object, the system initially creates the object as an address-referenced object.

In a variation on this embodiment, address-referenced objects are located in thread-local heaps, which can only be accessed by a thread associated with the heap, and identifier-referenced objects are located in a shared-memory space, which can be accessed by multiple threads.

In a variation on this embodiment, determining if the object is an address-referenced object or an identifier-referenced object involves checking an indicator, wherein the indicator is encoded in the address of an address-referenced object, or is encoded in the OID of an identifier-referenced object.

In a variation on this embodiment, accessing an identifier-referenced object involves looking up an entry associated with the object in a look-up table using the OID, retrieving an address for the object from the entry, and then accessing the object using the address.

In a variation on this embodiment, during a mutation operation on an identifier-referenced object, if the mutator modifies the identifier-referenced object to reference an address-referenced object, the system converts the address-referenced object into an identifier-referenced object.

In a further variation, converting the address-referenced object into an identifier-referenced object involves: creating an OID for the object; creating an entry for the OID in the look-up table; copying the contents of the object to an address for the object; writing the address for the object to the entry in the look-up table; and updating all references to the object so that the references use the OID.

In a further variation, converting the address-referenced object into an identifier-referenced object further involves converting any object that is transitively reachable from the address-referenced object into an identifier-referenced object.

In a further variation, an address-referenced object can reference an identifier-referenced object in the shared-memory space, whereas an identifier-referenced object cannot reference an address-referenced object in a thread-local heap.

In a further variation, the system performs a garbage-collection operation on a thread-local heap while the threads not associated with the thread-local heap continue to execute.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
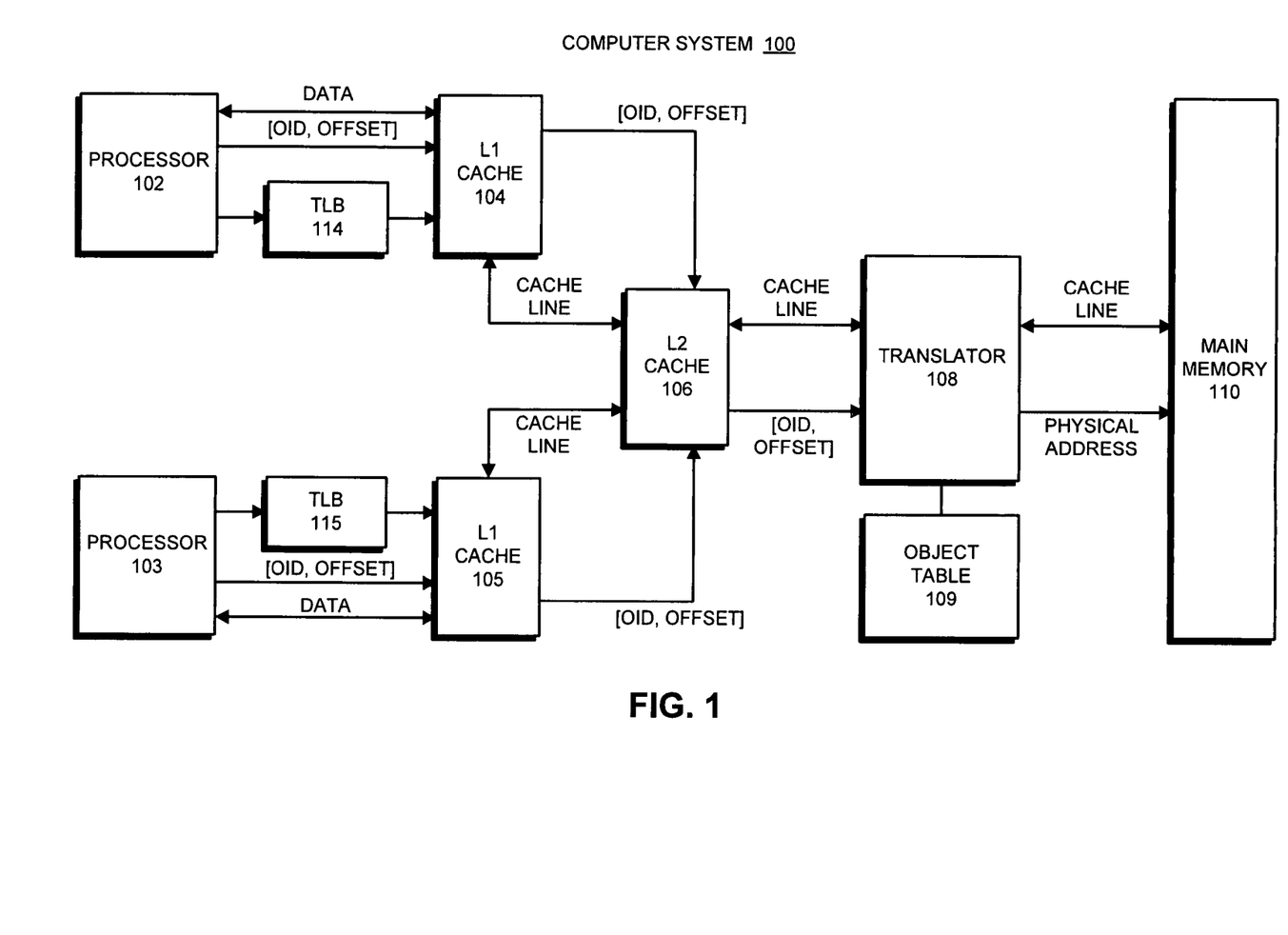
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 1, computer system 100 includes processors 102 and 103. Processors 102 and 103 access code and data from L1 caches 104 and 105, respectively. Note that L1 caches 104 and 105 can include unified instruction/data caches, or alternatively, separate instruction and data caches.

Processors 102 and 103 are associated with translation lookaside buffers (TLBs) 114 and 115, which facilitate translating virtual addresses into physical addresses for non-object references.

L1 cache 104 and L1 cache 105 make use of an extended address encoding procedure that enables L1 cache 104 to function as both a conventional cache and an object cache. For example, during a conventional load operation, a virtual address is sent from processor 102 to TLB 114. TLB 114 translates the virtual address into a physical address, which is subsequently used by L1 cache 104.

In contrast, during a load operation involving a portion of an identifier-referenced object, processor 102 obtains the corresponding object identifier (OID) and offset and combines them to create an object address. This object address is embedded into an unused portion of the physical address space to produce an encoded address. Note that the higher order bits of this encoded address are different than the higher order bits of any physical address. This allows the system to distinguish an encoded address from a physical address. When the encoded address is subsequently sent from processor 102 to L1 cache 104, the encoded address bypasses TLB 114 and directly enters L1 cache 104. Note that only minor modifications are required to conventional cache designs in order to provide object caching using the above-described technique.

In order to request a non-object data item, such as a value from a normal virtual address, processor 102 generates a virtual address that is sent to TLB 114. TLB 114 translates this virtual address into a physical address, which is sent to L1 cache 104.

Note that after an object address is translated into an encoded address L1 cache 104, L1 cache 105 and L2 cache 106 can treat the encoded address in the same manner as a normal physical address.

If a given data item (or instruction) is not located within L1 cache 104 or L1 cache 105, it is retrieved from L2 cache 106. If it is not located within L2 cache 106, it is pulled into L2 cache 106 from main memory 110.

Unlike in a conventional memory hierarchy, a translator 108 is interposed between L2 cache 106 and main memory 110. Translator 108 converts an object address, comprising an object ID and an offset, into a corresponding physical address, which is sent to main memory 110.

If an object is not present within L2 cache 106, the encoded address is forwarded to translator 108. Translator 108 uses an object table 109 to translate the encoded address into a corresponding physical address. Each entry in object table 109 associates a given object ID with a corresponding physical address in main memory where the object resides.

When a cache miss for an object occurs in L2 cache 106, translator 108 intercepts the encoded address and extracts the object ID. Next, translator 108 uses the object ID to index into object table 109 to obtain a corresponding base physical address. Once the base physical address is obtained, translator 108 converts the load request for the object into a load request for a physical address in main memory 110.

The system uses the base physical address and the offset to locate a specific cache line (or cache lines) in main memory 110. Fetching circuitry within translator 108 directs the normal load hardware to issue a load instruction to main memory 110. This fetching circuitry subsequently receives the cache line corresponding to the physical address. The fetching circuitry then forwards the cache line to L2 cache 106.

In the event of an eviction from L2 cache 106, translator 108 converts the encoded address containing the object ID and the offset into a physical address. The fetching circuitry subsequently uses the physical address to generate one or more store operations to store the evicted cache line in main memory 10.

Note that processors 102 and 103 are configured to handle the extended address encoding procedure described above. In one embodiment of the present invention, a platform-independent virtual machine, such as a Java Virtual Machine, is modified to generate requests for portions of an object using an object ID and an offset. Moreover, in one embodiment of the present invention, processors 102 and 103 are configured to execute special instructions for performing load and store operations involving an object ID and an offset—in addition to normal load and store instructions that use virtual addresses.

Although the present invention is described with reference to a computer system 100 with two levels of cache, the present invention can generally be used with any single-level or multi-level caching structure. Furthermore, although computer system 100 includes two processors, the present invention can generally be used with any number of processors.

Address-Referenced Object and Identifier-Referenced Object

One embodiment of the present invention provides a system that supports two different object referencing schemes concurrently. In this system, objects are classified as one of two possible types based on how they are referenced. Objects can either be address-referenced objects or identifier-referenced objects.

An address-referenced object is accessed through a reference containing an address of the object, wherein the address can be a virtual address or a physical address. If the address is a virtual address, accessing the object also involves translating the virtual address into a corresponding physical address.

An identifier-referenced object is accessed through a reference containing an identifier for the object. In one embodiment of the present invention, the identifier for the identifier-referenced object is the object identifier (OID), as described above. The process of accessing the identifier-referenced object typically starts by using the OID to look up an associated object table entry (OTE) in an object table. Next, the system retrieves an address for the identifier-referenced object from the OTE, wherein the address can be a virtual address or a physical address. If the address is a virtual address, the system also translates the virtual address into a corresponding physical address.

Figure 2A:
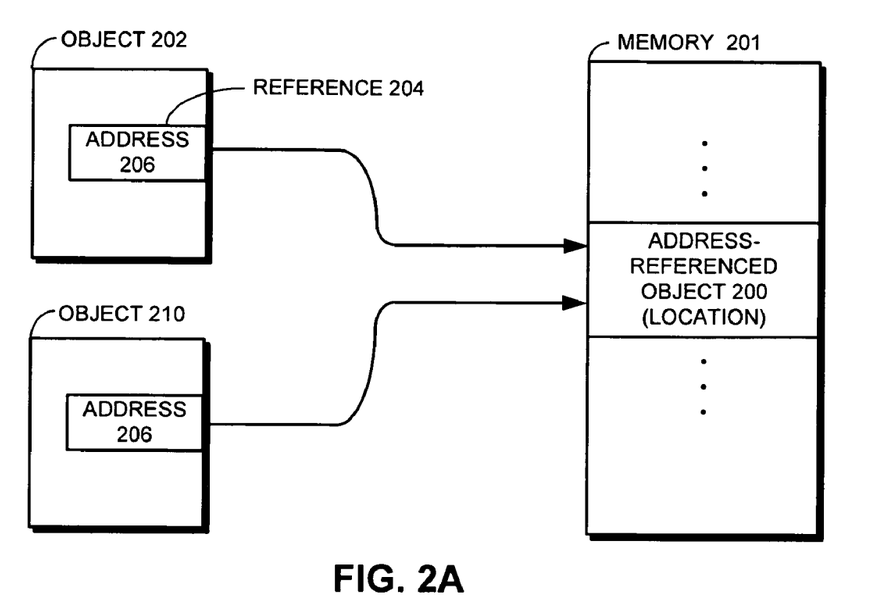
FIG. 2A illustrates references to an address-referenced object in accordance with an embodiment of the present invention.
Figure 2B:
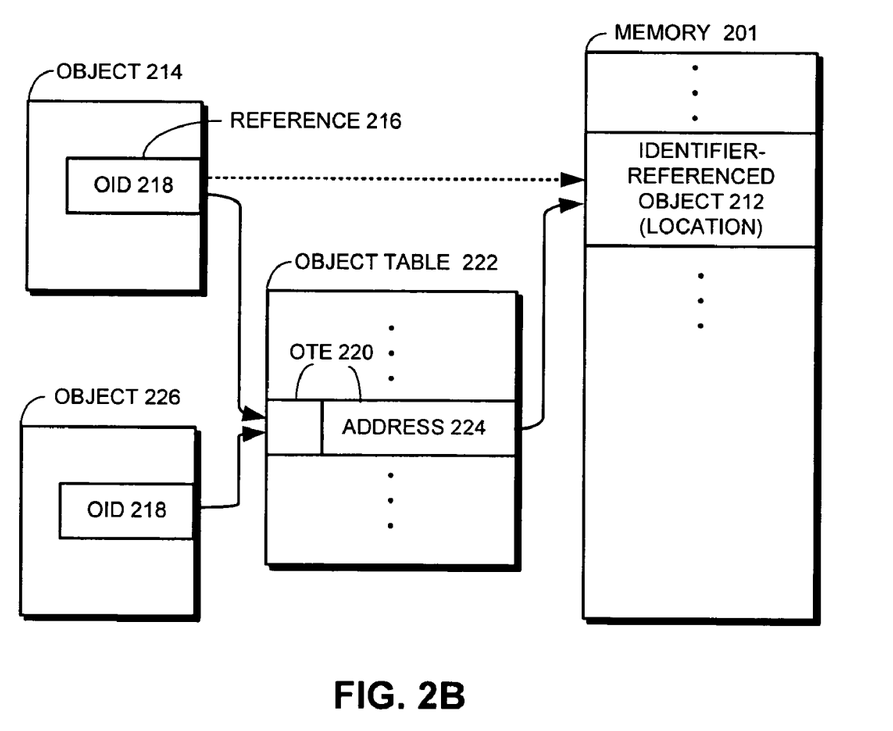
FIG. 2B illustrates references to an identifier-referenced object in accordance with an embodiment of the present invention.

FIGS. 2A and 2B illustrate the two object referencing schemes. FIG. 2A illustrates references to an address-referenced object 200 in accordance with an embodiment of the present invention. In this example, address-referenced object 200 in memory 201 is referred to by an object 202, which contains a reference 204. Reference 204 contains address 206, which can be a virtual address or a physical address of address-referenced object 200. Object 202 subsequently accesses object 200 using address 206.

Note that, if object 200 is subsequently relocated in memory 201, the system must update reference 204 to point to the new virtual or physical address of object 200. This also applies to another object 210, which also references object 200. Note that the system must update all the associated references when an address-referenced object is relocated.

FIG. 2B illustrates references to an identifier-referenced object 212 in accordance with an embodiment of the present invention. In this example, an identifier-referenced object 212 in memory 201 is referenced by an object 214, which contains a reference 216. Reference 216 contains OID 218, which is used to index OTE 220 in an object table 222. OTE 220 contains an address 224 (which can be a virtual address or a physical address), which is used to access object 212.

Note that, if object 212 is subsequently relocated in memory 201, the system does not have to update the associated OID 218. For this reason, an identifier-referenced object is typically referred to as a "location-independent" object. However, the system is responsible for updating the new address of object 212 in OTE 220. Note that a second object 226, which contains a reference to object 212, uses the same OID 218. Hence, object 226 does not have to be updated during the relocation. In this way, a system which supports identifier-referenced objects reduces overhead of updating multiple references when an object referenced by multiple objects is relocated.

Note that since address-referenced objects and identifier-referenced objects may be co-located in memory 201, it is necessary to provide a mechanism to distinguish them. In one embodiment of the present invention, an indicator bit may be included in both the address 206 of object 200 and the OID 218 of object 212 for this purpose. A more-detailed description of the identifier-referenced objects can be found in U.S. Pat. No. 6,859,868, entitled "Object Addressed Memory Hierarchy," by inventors Gregory M. Wright, Mario I. Wolczko, and Matthew L. Seidl.

Allocating an Unshared/New Object

In one embodiment of the present invention, a system that supports both address-referenced objects and identifier-referenced objects initially creates an object in the memory as an address-referenced object. This is beneficial because allocating an address-referenced object in the memory is typically faster than allocating an identifier-referenced object. Note that an address-reference object can be allocated quickly in contiguous spaces in the memory. For example, the object may be allocated using a conventional pointer-bumping allocation technique (see Richard Jones & Rafael Lins, "Garbage Collection: Algorithms for Automatic Dynamic Memory Management," Wiley, 1996). In contrast, creating an identifier-referenced object involves assigning a new OID and an associated OTE to the new object, as well as assigning a region of free memory to hold the object's contents.

Note that managing OIDs requires significantly more overhead. However, most newly allocated objects will not be shared among threads, and hence do not need the flexibility of OID addressing. Consequently, this additional overhead is often wasted.

In one embodiment of the present invention, new objects are first allocated into a thread-local heap (TLH), where the newly allocated objects are unshared and are not referenced by any threads other than a thread associated with the TLH. In contrast, identifier-referenced objects are located in a shared-memory space which can be accessed by multiple threads. Maintaining both TLHs for address-reference objects and a shared-memory space for identifier-reference objects can be beneficial for a garbage-collection operation as is discussed in more-detail below.

Converting an Address-Referenced Object to an Identifier-Referenced Object

In one embodiment of the present invention, the system allows an address-referenced object to be converted into an identifier-referenced object. During the conversion process, the address-referenced object is relocated from a TLH to a shared-memory space, and can be subsequently shared by other threads.

Typically, an address-referenced object in a TLH can reference an identifier-referenced object in the shared-memory space. However, it is forbidden for an identifier-referenced object in the shared-memory space to reference an address-referenced object in a TLH. Furthermore, it is also forbidden for an address-referenced object in one TLH to reference another address-referenced object in a second TLH. Often, it becomes necessary to share an object in a TLH as the object ages. The conversion process facilitates resolving these forbidden situations by allowing address-referenced objects to be converted into identifier-referenced objects and promoted to the shared-memory space.

In one embodiment of the present invention, a conversion process occurs during a mutation operation. Specifically, during a mutation operation on an identifier-referenced object in a shared-memory space, if the mutator modifies the identifier-referenced object to reference an address-referenced object in a TLH, the system converts the address-referenced object in the TLH into an identifier-referenced object in the shared-memory space. This conversion occurs during the mutation operation and involves using a triggering mechanism to trigger the conversion. This triggering mechanism is described in the example below.

Note that, the above-described conversion may cause additional objects to be converted and promoted into the shared-memory spaces. In particular, an object that is transitively reachable from a converted object is therefore also potentially reachable by a thread that references the converted object. Hence, any object that is transitively reachable from the converted object is also converted into the shared-memory space.

Figure 3A:
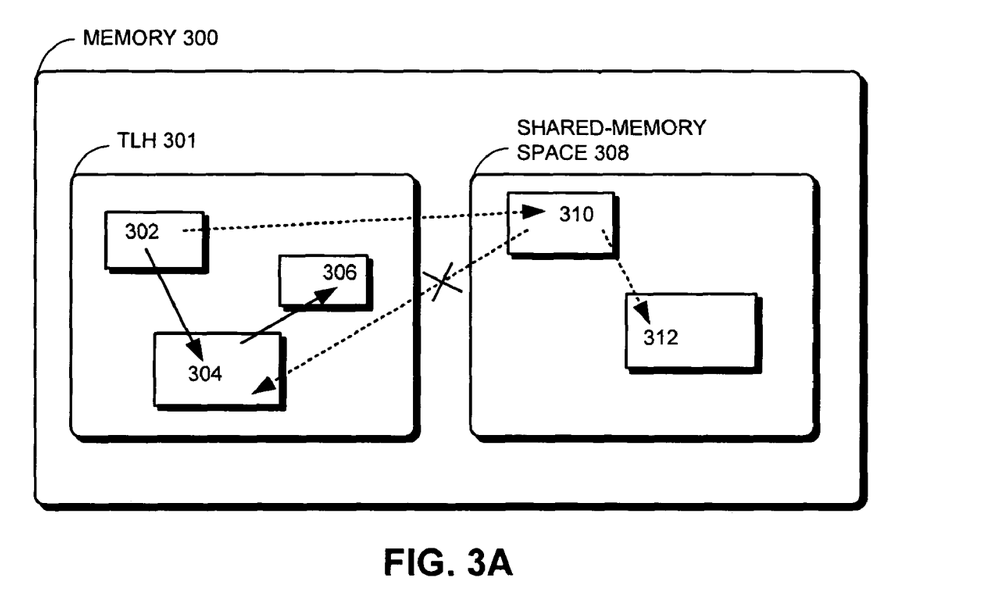
FIG. 3A illustrates a thread-local heap (TLH) and a shared-memory space in accordance with an embodiment of the present invention.
Figure 3B:
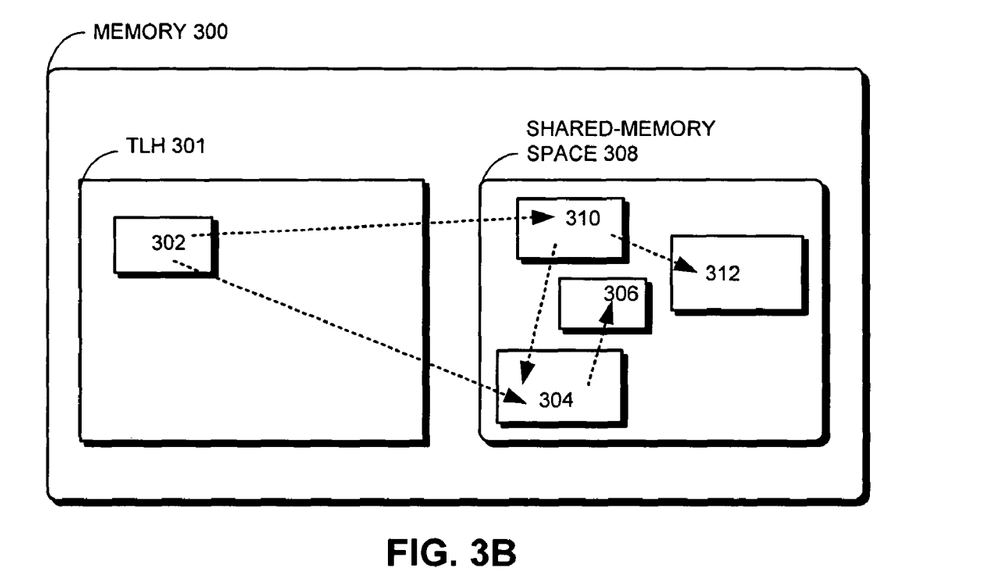
FIG. 3B illustrates a process of converting an address-referenced object into an identifier-referenced object in accordance with an embodiment of the present invention.

FIGS. 3A and 3B illustrate an exemplary scenario of converting an address-referenced object into an identifier-referenced object in accordance with an embodiment of the present invention.

More specifically, FIG. 3A illustrates a TLH 301 and a shared-memory space 308 in accordance with an embodiment of the present invention. In FIG. 3A, memory 300 contains TLH 301, which further contains three address-referenced objects 302, 304, and 306. Memory 300 also contains a shared-memory space 308, which contains two identifier-referenced objects 310 and 312. In FIG. 3A, an arrow with solid line represents a reference through an address, while an arrow with dashed line represents a reference through an OID. For example, object 302 references object 304 through the address of object 304, while object 310 references object 312 through the OID of object 312. Note that an address-referenced object 302 in TLH 301 can also reference an identifier-referenced object 310 in shared-memory space 308 through its associated OID.

In one scenario, during object manipulation a mutator attempts to establish a reference from identifier-referenced object 310 in shared-memory space 308 to an address-referenced object 304 in TLH 301. Since this type of reference is forbidden, it triggers a conversion operation which converts the address-referenced object 304 to become an identifier-referenced object and promotes the converted object to shared-memory 308.

FIG. 3B illustrates a process of converting an address-referenced object into an identifier-referenced object in accordance with an embodiment of the present invention. During operation, object 304 is assigned an OID and copied to shared-memory space 308. Since object 306 is transitively reachable from object 304, object 306 is also converted to shared-memory space 308 and is also associated with an OID. Next, the reference from object 310 to object 304 is updated by storing the new OID of object 304 into object 310. Furthermore, all existing references to the converted objects 304 and 306 must be located and updated to use the new OID. For example, the reference from object 302 to object 304 is changed from a reference through address to a reference through OID. Note that the process of identifying all the transitively reachable objects is similar to a recursive traversal from the roots (stacks and register values) during a mark-sweep garbage-collection process in a TLH. Hence, the conversion process may also be used to trigger a concurrent garbage collection in the TLH.

Figure 4:
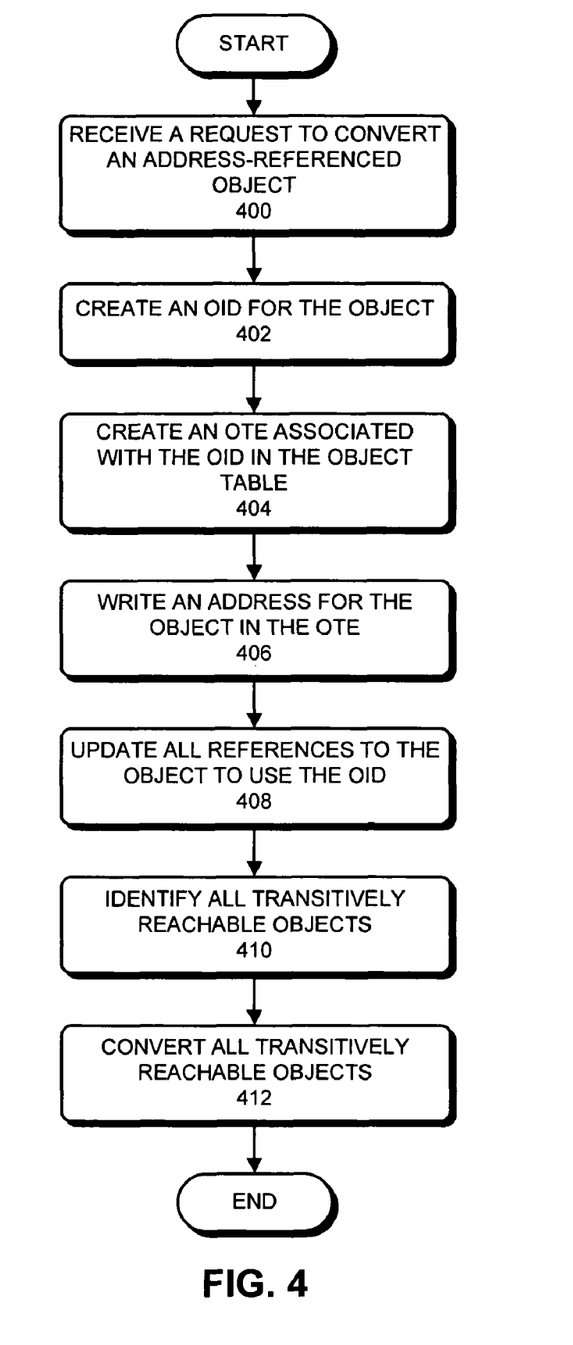
FIG. 4 presents a flowchart illustrating the process of converting an address-referenced object into an identifier-referenced object in accordance with an embodiment of the present invention.

FIG. 4 presents a flowchart illustrating the process of converting an address-referenced object into an identifier-referenced object in accordance with an embodiment of the present invention.

The conversion process starts by receiving a request to convert an address-referenced object into an identifier-referenced object (step 400). This request can be generated by a write-barrier which detects a store of a memory address into an OID-referenced object. Specifically, the write-barrier may take the form of a trap/interrupt, or a branch to a previously-identified instruction. An implementation of generating the request is provided in the example below. Next, the process creates an OID for the object which is to be converted (step 402), and subsequently creates an OTE associated with the OID in an object table (step 404). The process then writes an address for the object in the OTE of the object table (step 406). Note that if this address is different in the memory from the previous address of the object associated with the TLH then the contents of the object must also be copied to the new location. Next, the process must locate all the existing references to the object and update these references by changing the associated contents from the address of the object to the OID of the object using the new OID (step 408). The process then identifies all transitively reachable objects from the converted object (step 410), and similarly converts these objects to identifier-reference objects (step 412).

Concurrent Garbage Collection

A system based on location-independent identifier-addressed objects can facilitate a concurrent garbage collection or compaction operation. Specifically, when an identifier-addressed object is relocated, the new address for the object is updated in the associated OTE in the object table. This change is invisible to other objects referencing the object through the OID of the object, which is not changed during the relocation. Because of this property, concurrent garbage collection or compaction in the shared-memory space can occur while mutator threads continue to execute independently. On the other hand, concurrent garbage collection can also occur in the TLH, while the threads associated with the other TLHs continue to execute independently.

Hence, for a system which has large heap sizes and large numbers of threads, by supporting both address-referenced objects and identifier-referenced objects, the system can facilitate concurrent garbage collection which can reduce garbage collection overhead and associated pause time.

Example of Implementation

Figure 5:
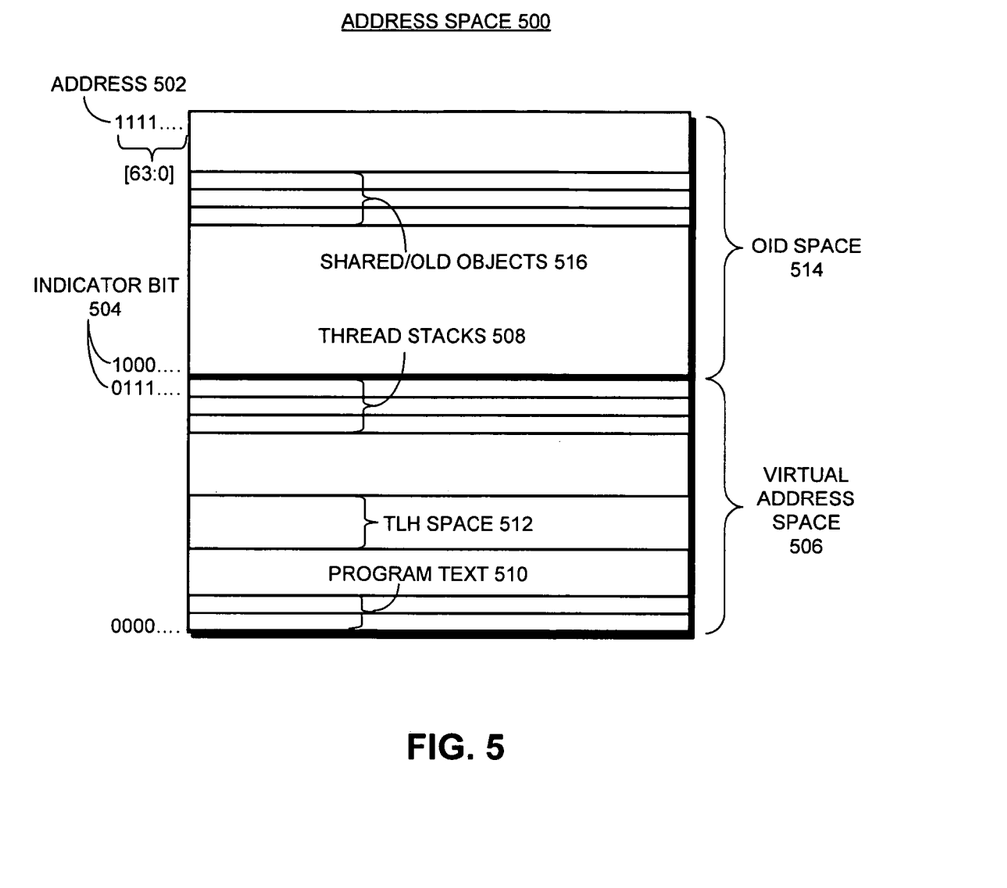
FIG. 5 illustrates an exemplary partition of an address space containing both ordinary addresses and object identifiers (OIDs) in accordance with an embodiment of the present invention.

FIG. 5 illustrates an exemplary partition of an address space 500 containing both ordinary virtual addresses and OIDs in accordance with an embodiment of the present invention. Address space 500 contains 64-bit address 502 wherein the high bit or the indicator bit 504 is used to distinguish ordinary virtual addresses from OIDs. Indicator bit 504 thus divides address space 500 into two distinct partitions. Ordinary virtual address partition 506 (which has indicator bit 504 set to 0) can include thread stacks 508, program text 510, and TLH space 512, which contains newly created unshared objects. Note that, in a particular TLH, a most-recently created object is typically associated with an address on the topmost portion of the heap. On the other hand, OID-space partition 514 (which has indicator bit 504 set to 1) can include identifier-referenced objects 516 which are old/shared objects.

Figure 6:
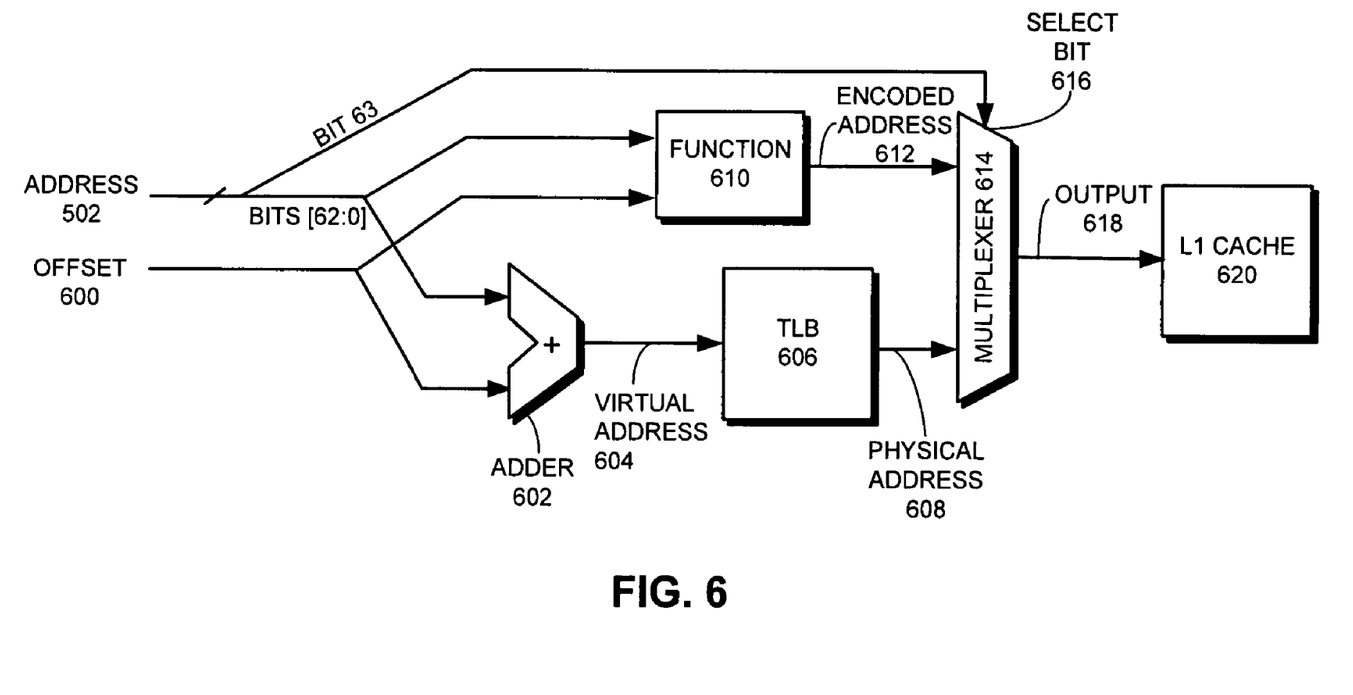
FIG. 6 illustrates a hardware implementation of a system that can access both address-referenced objects and OID-referenced objects in accordance with an embodiment of the present invention.

FIG. 6 illustrates a hardware implementation of a system that can access both address-referenced objects and OID-referenced objects in accordance with an embodiment of the present invention.

Similar to a conventional memory-management system, the addressing process starts with an instruction that loads two source operands: (1) address 502 of an object, which can be either an ordinary virtual address or an OID depending on the type of addressing scheme; and (2) offset 600 within the object. Next, address 502 is separated into the lower 63 bits and the high bit 63. The lower 63 bits and offset 600 are then duplicated and processed in two different paths concurrently.

In one of the paths in FIG. 6, the lower 63 bits and offset 600 are summed by adder 602 to produce a virtual address 604, which is then fed into TLB 606. TLB 606 then translates virtual address 604 into physical address 608. Note that this path will generate a correct physical address only if address 502 is in virtual address space 506.

In the other path in FIG. 6, the lower 63 bits and offset 600 are combined and encoded by function 610 to produce an encoded address 612. (A detailed description of function 610 can be found in Sun Microsystems Laboratories Technical Report TR-2005-143, "An Object-Aware Memory Architecture," by Greg Wright, Matthew L. Seidl, Mario Wolczko.) Encoded address 610 is associated with OID-addressed objects, and thus has a different structure from physical address 608.

Both physical address 608 and encoded address 612 are the inputs of a two-input, one-output multiplexer 614. A select bit 616 of multiplexer 614 gets the value from the indicator bit 63 of address 502. The output 618 of multiplexer 614 is selected by select bit 616 based on the associated referencing scheme, and is then entered into L1 cache 620. Note that accessing an OID-based object bypasses TLB 606.

Figure 7:
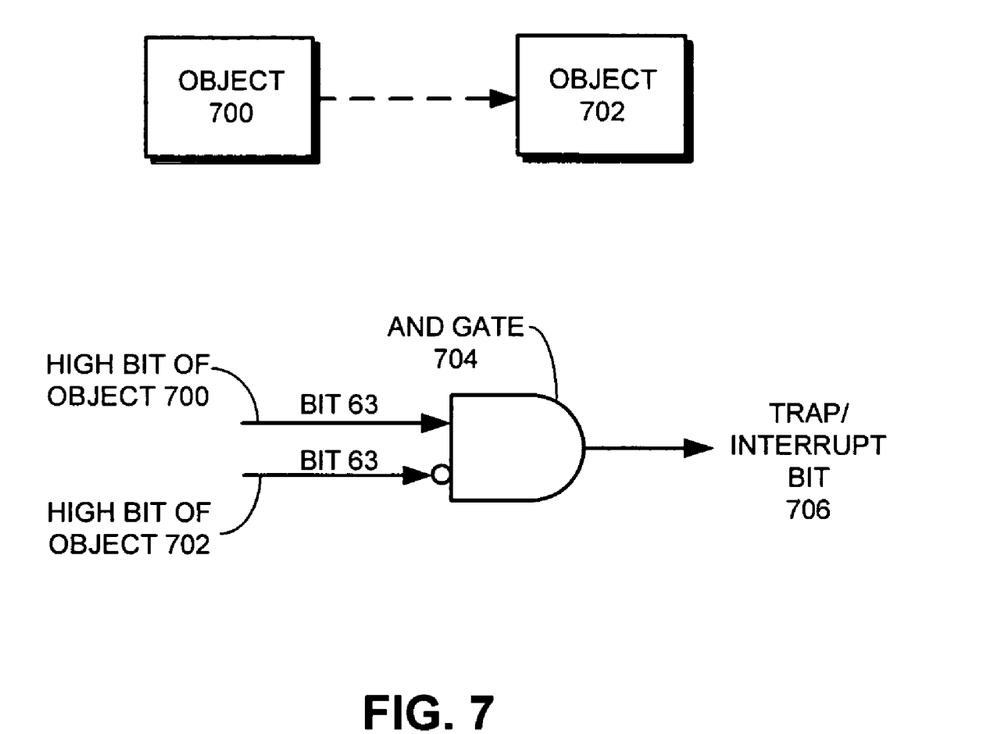
FIG. 7 illustrates how to determine if an address-referenced object needs to be converted to an OID-based object in accordance with an embodiment of the present invention.

FIG. 7 illustrates how to determine if an address-referenced object needs to be converted to an OID-based object in accordance with an embodiment of the present invention. In a typical store-reference instruction, object 700 attempts to establish a reference to object 702. Prior to executing the store-reference instruction, the high bits of the associated entries for object 700 and object 702 in address space 500 are examined. Specifically, bit 63 associated with object 700 and the inverted bit 63 associated with object 702 are coupled into a two-port AND logic 704. If object 700 is an identifier-referenced object which has {bit 63=1} and object 702 is an address-referenced object with has {bit 63=0}, the output of AND logic 704 becomes 1, which then sets a trap bit 706. Setting trap bit 706 indicates a shared object is trying to access an unshared object, which is forbidden. This in turn triggers a write-barrier. The write-barrier subsequently initiates a conversion process. Hence, before object 702 can be referenced by object 700, it is promoted to become an identifier-referenced object.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing objects in a memory-management system which supports both address-referenced objects and identifier-referenced objects, the method comprising:
   receiving a request to access an object;
   determining whether the object is an address-referenced object or an identifier-referenced object by determining an organization of a reference object that is used to access the object,
      wherein the object is the address-referenced object if the object is accessed using a reference object that contains an address of the object in memory;
      wherein the object is the identifier-referenced object if the object is accessed using a reference object that contains an object identifier (OID) that is used to look up an address of the object in memory in a corresponding entry in an object table; and
      wherein the determining whether the object is the address-referenced object or the identifier-referenced object involves checking an indicator in the reference object that contains the OID, wherein the indicator is encoded in the address of the address-referenced object, or is encoded in the OID of the identifier-referenced object;
   if the object is the address-referenced object, accessing the object using the address contained in the reference object, wherein when the address-referenced object is in a thread-local heap (TLH) and is referenced by the identifier-referenced object,
   converting the address-referenced object into an identifier-referenced object; and
   relocating the converted identifier-referenced object from the TLH to a shared-memory space; and
   if the object is the identifier-referenced object, accessing the object by using the OID contained in the reference object to look up the address for the object in the corresponding entry in the object table, and then using the address to access the object.

2. The method of claim 1, wherein prior to accessing the object, the method further comprises initially creating the object as an address-referenced object.

3. The method of claim 1,
   wherein address-referenced objects are located in thread-local heaps, which can only be accessed by a thread associated with the thread-local heaps; and
   wherein identifier-referenced objects are located in a shared-memory space, which can be accessed by multiple threads.

4. The method of claim 1, wherein accessing an identifier-referenced object involves:
   looking up an entry associated with the object in a look-up table using the OID;
   retrieving an address for the identifier-referenced object from the entry; and
   accessing the object using the address.

5. The method of claim 1, wherein during a mutation operation on an identifier-referenced object, if a mutator modifies the identifier-referenced object to reference an address-referenced object, the method further comprises converting the address-referenced object into an identifier-referenced object.

6. The method of claim 5, wherein converting the address-referenced object into an identifier-referenced object involves:
   creating an OID for the object;
   creating an entry for the OID in the look-up table;
   copying the contents of the object to an address for the object;
   writing the address for the object to the entry in the look-up table; and
   updating all references to the object so that the references use the OID.

7. The method of claim 5, wherein converting the address-referenced object into an identifier-referenced object further involves converting any object that is transitively reachable from the address-referenced object into an identifier-referenced object.

8. The method of claim 3,
   wherein an address-referenced object can reference an identifier-referenced object in the shared-memory space; and
   wherein an identifier-referenced object cannot reference an address-referenced object in the thread-local heap.

9. The method of claim 3, further comprising performing a garbage collection operation on the thread-local heap while the threads not associated with the thread-local heap continue to execute in their own thread-local heaps or the shared memory space.

10. A computer-readable storage medium storing instructions that when executed by a computer cause the computer to manage objects in a memory-management system which supports both address-referenced objects and identifier-referenced objects and to perform steps of:
  receiving a request to access an object;
  determining whether the object is an address-referenced object or an identifier-referenced object by determining an organization of a reference object that is used to access the object,
    wherein the object is the address-referenced object if the object is accessed using a reference object that contains an address of the object in memory;
    wherein the object is the identifier-referenced object if the object is accessed using a reference object that contains an object identifier (01D) that is used to look up an address of the object in memory in a corresponding entry in an object table; and
    wherein the determining whether the object is the address-referenced object or the identifier-referenced object involves checking an indicator in the reference object that contains the OID, wherein the indicator is encoded in the address of the address-referenced object, or is encoded in the OID of the identifier-referenced object;
  if the object is the address-referenced object, accessing the object using the address contained in the reference object, wherein when the address-referenced object is in a thread-local heap (TLH) and is referenced by the identifier-referenced object,
    converting the address-referenced object into an identifier-referenced object; and
    relocating the converted identifier-referenced object from the TLH to a shared-memory space; and
  if the object is the identifier-referenced object, accessing the object by using the OID contained in the reference object to look up the address for the object in the corresponding entry in the object table, and then using the address to access the object.

11. The computer-readable storage medium of claim 10, wherein prior to accessing the object, initially creating the object as an address-referenced object.

12. The computer-readable storage medium of claim 10,
  wherein address-referenced objects are located in thread-local heaps, which can only be accessed by a thread associated with the heap; and
  wherein identifier-referenced objects are located in a shared-memory space, which can be accessed by multiple threads.

13. The computer-readable storage medium of claim 10, wherein accessing an identifier-referenced object involves:
  looking up an entry associated with the object in a look-up table using the OID;
  retrieving an address for the identifier-referenced object from the entry; and
  accessing the object using the address.

14. The computer-readable storage medium of claim 10, wherein during a mutation operation on an identifier-referenced object, if a mutator modifies the identifier-referenced object to reference an address-referenced object, the method further comprises converting the address-referenced object into an identifier-referenced object.

15. The computer-readable storage medium of claim 14, wherein converting the address-referenced object into an identifier-referenced object involves:
  creating an OID for the object;
  creating an entry for the OID in the look-up table;
  copying the contents of the object to an address for the object;
  writing the address for the object to the entry in the look-up table; and
  updating all references to the object so that the references use the OID.

16. The computer-readable storage medium of claim 14, wherein converting the address-referenced object into an identifier-referenced object further involves converting any object that is transitively reachable from the address-referenced object into an identifier-referenced object.

17. The computer-readable storage medium of claim 12, further comprising performing a garbage collection operation on the thread-local heap while the threads not associated with the thread-local heap continue to execute in their own thread-local heaps or the shared memory space.

18. A computer system that manages objects in a memory-management system which supports both address-referenced objects and identifier-referenced objects, the computer system comprising:
  a processor;
  a memory;
  a receiving mechanism implemented in the computer system and configured to receive a request to access an object;
  an accessing mechanism implemented in the computer system and configured to determine whether the object is an address-referenced object or an identifier-referenced object by determining an organization of a reference object that is used to access the object,
    wherein the object is the address-referenced object if the object is accessed using a reference object that contains an address of the object in memory;
    wherein the object is the identifier-referenced object if the object is accessed using a reference object that contains an object identifier (OID) that is used to look up an address of the object in memory in a corresponding entry in an object table; and
    wherein the determining whether the object is the address-referenced object or the identifier-referenced object involves checking an indicator in the reference object that contains the OID, wherein the indicator is encoded in the address of the address-referenced object, or is encoded in the OID of the identifier-referenced object;
    wherein if the object is the address-referenced object, the accessing mechanism is configured to access the object using the address contained in the reference object,
    wherein when the address-referenced object is in a thread-local heap (TLH) and is referenced by the identifier-referenced object, the accessing mechanism is further configured to:
      convert the address-referenced object into the identifier-referenced object; and
      relocate the converted identifier-referenced object from the TLH to a shared-memory space; and
  wherein if the object is an identifier-referenced object, the accessing mechanism is configured to access the object by using the OID contained in the reference object to look up the address for the object in the corresponding entry in the object table, and then using the address to access the object.

* * * * *